Patented Aug. 25, 1931

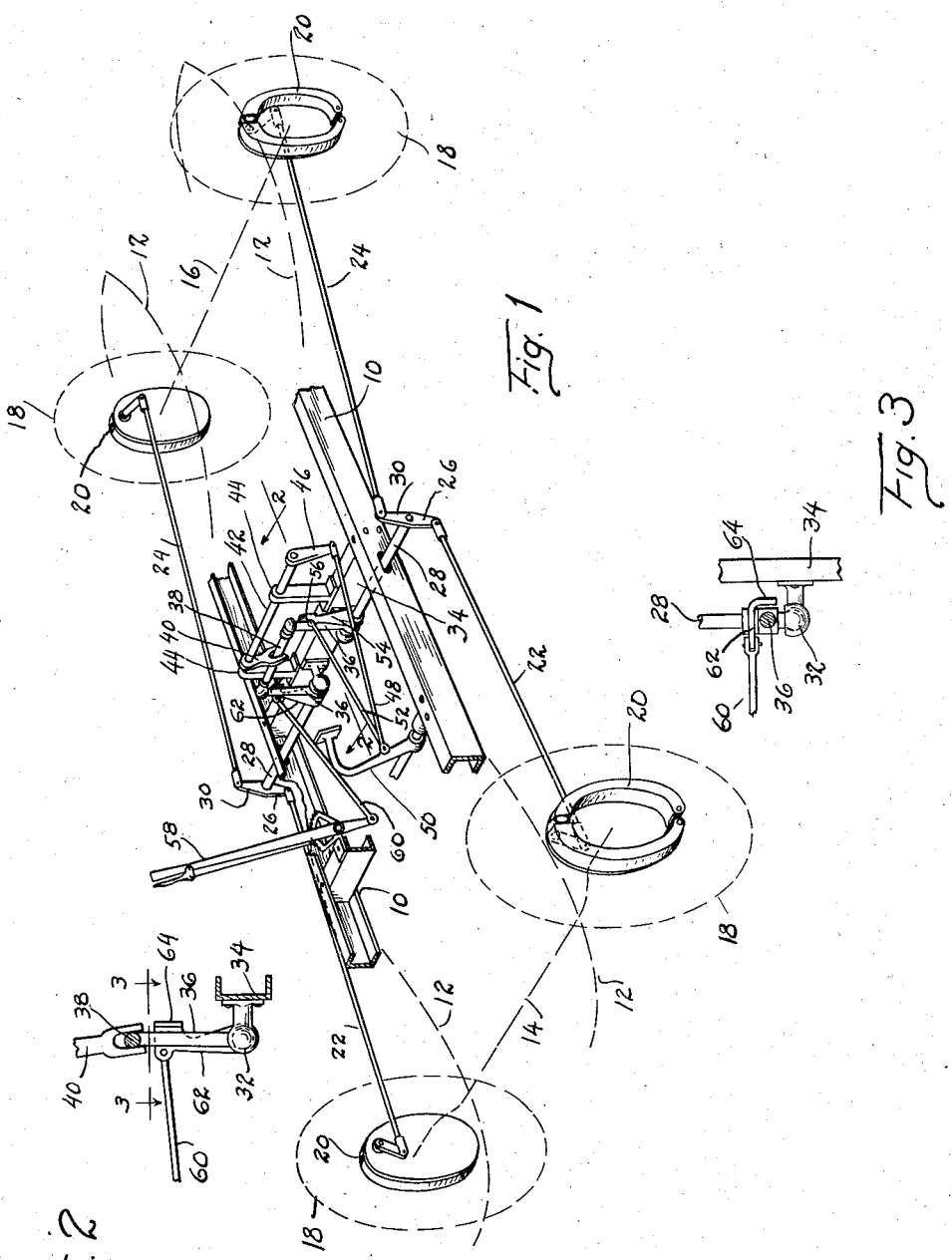

1,820,472

UNITED STATES PATENT OFFICE

MONTGOMERY W. McCONKEY, OF SOUTH BEND, INDIANA, ASSIGNOR TO BENDIX BRAKE COMPANY, OF CHICAGO, ILLINOIS, A CORPORATION OF ILLINOIS

BRAKE OPERATING MECHANISM

Original application filed January 25, 1928, Serial No. 249,294. Divided and this application filed December 27, 1928. Serial No. 328,683.

My invention relates to improvements in brake operating mechanism and is illustrated as embodied in novel operating means for a set of four wheel automobile brakes.

An object of my invention is to arrange the parts in a simple and inexpensive manner so that the brakes may be operated through equalized connections by one operating member such as a pedal, and through connections in part unequalized by the same operating member in conjunction with a second operating member, and whereby said second operating member, which may be a hand lever, may be utilized to operate a portion of said brakes only without regard to injury or breakage of the connections for equalizing said portion with the remainder of the brakes.

With these objects in view the mechanism may include a pair of shafts arranged end to end crosswise of the vehicle and universally mounted at their inner ends so that their outer ends may float to equalize between the front and rear brakes operated thereby. These shafts may be operated through equalizing means coupled with the usual service brake pedal which also has an auxiliary tension connection leading to one of the shafts to actuate the same to operate the brakes controlled by said shaft notwithstanding failure or breakage of the equalizing connections between the shafts, while the usually provided hand lever may be coupled with the other shaft through connections operable to apply the brakes controlled thereby notwithstanding failure or breakage of the equalizing means with the other shaft.

The above objects and others together with various meritorious advantages of my improvement will more fully appear from the following specification, appended claims and accompanying drawings, wherein,—

Fig. 1 is a diagrammatic perspective view of an automobile chassis showing my improved operating mechanism in use thereon.

Fig. 2 is a partial section on the line 2—2 of Fig. 1, and

Fig. 3 is a section on the line 3—3 of Fig. 2 showing certain details.

This application is a division of my application, Ser. No. 249,294, filed January 25, 1928.

The automobile chassis includes the usual vehicle frame 10 supported at front and rear by springs 12 on front and rear axles 14 and 16, all illustrated in diagram. Front and rear axles are supported by road wheels 18, each of which is equipped with suitable brake mechanism 20. The front brakes are operated by connections such as rods or cables 22 and the rear brakes by other tension connections 24. The connections 22 on the front brakes are connected at their rear ends to arms 26 arranged on the outer ends of two shafts 28, while the connections on the rear brakes are connected at their front ends to similar oppositely extending arms 30 on the shafts 28. The shafts 28 are supported at their outer ends to permit them to float between the front and rear brakes to equalize the pressure therebetween.

The inner end of each shaft 28 is universally supported to permit the above described floating without interfering with the turning of the shaft as, for example, by being provided with an integral ball 32 received in a corresponding socket carried by a cross-member 34 of the vehicle frame.

Secured adjacent to the inner end of each shaft 28 is an upwardly extending arm or operating lever 36. The two levers 36 are connected by means such as an equalizer bar 38 which is received within a fork 40 which fork is carried by an operating shaft 42 journalled in bearings 44 mounted on the vehicle frame cross-member 34. This shaft 42 has an arm 46 secured to one end and connected by a rod or cable 48 with the usual brake pedal 50 or its equivalent.

The above described arrangement permits the operation of all four of the brakes by depression of the pedal with full equalization therebetween. The brake pedal is provided with a separate or auxiliary tension connection 52 which leads to an arm 54 loosely mounted on the shaft 28 adjacent thereof to the operating lever 36 and having a lug 56 extending behind the operating lever 36 which is affixed to the shaft 28 so as to serve as a one-way operating connection for said shaft while permitting independent operation of the shaft through the equalized means.

The hand lever 58 is suitably supported and connected by a tension element 60 with an arm 62 loosely mounted on the other shaft 28 adjacent to the arm 36 which is secured to such shaft, and the arm 62 has a lug 64 which extends behind the adjacent arm 36 so as to form a one-way operating connection for the shaft 28 when the hand lever is actuated while permitting independent operation of the shaft through the equalized means by the brake pedal.

It will be seen that depression of the brake pedal serves normally to operate both sets of brakes through the equalized means while, if the equalized means is injured or broken, at least one set of brakes will be operated by depression of the pedal through the one-way operating connection heretofore described and the other set of brakes may be operated through the hand lever entirely independently of the equalized means.

What I claim is:

1. A vehicle having, in combination, brakes, a shaft arranged to operate part of the brakes, a second shaft arranged to operate the remainder of the brakes, means for equalizing the brakes associated with each shaft, equalized means for operating the two shafts, an operating member arranged to operate both shafts through said equalized means, an auxiliary connection from said operating member to one of the shafts, and another operating member having a separate connection to the other of said shafts.

2. A vehicle having, in combination, brakes, a shaft arranged to operate part of the brakes, a second shaft arranged to operate the remainder of the brakes, means for equalizing the brakes associated with each shaft, equalized means for operating the two shafts, an operating member arranged to operate both shafts through said equalized means, and means including said operating member and a second independently operable member arranged to operate both shafts through unequalized connections.

3. A vehicle having, in combination, brakes, a shaft arranged to operate part of the brakes, a second shaft arranged to operate the remainder of the brakes, means for equalizing the brakes associated with each shaft, equalized means for operating the two shafts, an operating member arranged to operate both shafts through said equalized means, and an auxiliary connection from said operating member to one of the shafts to operate the brakes controlled thereby independently of the brakes controlled by the other shaft.

4. A vehicle having, in combination, two pairs of brakes, a shaft arranged to operate each pair of brakes, means for equalizing the brakes associated with each shaft, equalizing means connecting the said shafts, an operating member connected with the shafts through said means to operate both pairs of brakes, and an auxiliary connection from said operating member to one of said shafts independently of the equalizing means.

5. A vehicle having, in combination, two pairs of brakes, two shafts arranged end to end crosswise of the vehicle, one shaft connected with one pair of brakes and the other shaft connected with the other pair of brakes, equalizing means connecting said shafts, an operating member connected with the shafts through said means to operate both pairs of brakes equalizing one pair against the other, an auxiliary connection leading from said operating member to one of said shafts independently of the equalizing means to operate the brakes controlled by said shaft and a second operating member connected with the other shaft to operate the same independently of the equalizing means.

6. A vehicle having, in combination, a pair of right brakes, a pair of left brakes, operating connections therefor equalizing one pair of brakes against the other, means for equalizing the brakes of each pair an operating member connected with the brakes through said equalizing connections, an auxiliary operating connection between said operating member and one pair of brakes not equalized as against the other pair of brakes.

7. A vehicle having, in combination, a pair of right brakes, a pair of left brakes, means for equalizing the brakes of each pair, operating connections therefor equalizing one pair of brakes against the other, an operating member connected with the brakes through said equalizing connections, an auxiliary operating connection between said operating member and one pair of brakes not equalized as against the other pair of brakes, and a second operating member connected with the other pair of brakes through means not equalized as to the first pair of brakes.

8. A vehicle having, in combination, a pair of right brakes, a pair of left brakes, two operating members, means connecting one operating member with both pairs of brakes through connections equalizing the brakes in each pair against the other and equalizing one pair of brakes against the other, an auxiliary operating connection between one of said pairs of brakes and said operating member not equalized as against the other pair of brakes, and means connecting the other operating member with the other pair of brakes not equalized as against the first pair of brakes.

9. A vehicle having, in combination, a pair of right brakes, a pair of left brakes, two independently operable operating members, means connecting one operating member with all the brakes equalizing the brakes in the pair as against each other and each pair of brakes as against the other, said operating member being also connected with one pair of brakes through means equalized only as to the brakes in the pair and not as against the other pair of brakes, and means connecting the other operating member with the other other pair of brakes equalized only as to the brakes in the pair and not as against the other pair of brakes.

10. A vehicle having, in combination, a pair of right brakes, a pair of left brakes, means for equalizing the brakes of each pair, an operating pedal connected with both pairs of brakes through equalized connections to operate the brakes, and a hand lever connected with the brakes on one side of the vehicle only to operate said brakes.

11. A vehicle having, in combination, two pairs of brakes, means connecting and equalizing the brakes in each pair as against each other, means connecting and equalizing the two pairs of brakes as against each other, a pedal connected with and operating said brakes through said equalizing means, and an auxiliary connection from said pedal to one pair of brakes only.

12. A vehicle having, in combination, a pair of right brakes, a pair of left brakes, means for equalizing the brakes of each pair, an operating member connected with both pairs of brakes to operate the brakes and a second operating member connected with the brakes on one side of the vehicle only to operate the brakes on such side of the vehicle.

13. In combination with a motor vehicle a pair of brake actuating shafts rotatably journalled at their inner ends and semi-floating at their outer ends, an equalizer bar connected with the inner ends of said shafts, a brake operating member, a connection between said member and the equalizer bar for actuating the same, and a disconnected coupling between said member and the inner end of one of the brake actuating shafts whereby the same may be actuated independently of the equalizer bar.

14. In combination with a motor vehicle a pair of brake actuating shafts rotatably journalled at their inner ends and semi-floating at their outer ends, an equalizer bar connected with the inner ends of said shafts, a brake operating member, a connection between said member and the equalizer bar for actuating the same, a disconnected coupling between said member and the inner end of one of the brake actuating shafts whereby the same may be actuated independently of the equalizer bar, and a second manually operable member similarly connected to the inner end of the other actuating shaft.

15. In combination with a motor vehicle, a pair of brake actuating shafts rotatably journalled at their inner ends and supported for horizontal movement at their outer ends, an arm secured to the inner end of each of said shafts, an equalizer bar connecting said arms, a rod rotatably journalled adjacent said equalizer bar, an arm secured to said rod and having a bifurcated extremity engaging said equalizer bar, a second arm secured to said rod, a brake pedal, a connection between said last mentioned arm and said pedal, and a disconnected coupling between one of said brake actuating shaft arms and said brake pedal.

16. In combination with a motor vehicle, a pair of brake actuating shafts rotatably journalled at their inner ends and supported for horizontal movement at their outer ends, an arm secured to the inner end of each of said shafts, an equalizer bar connecting said arms, a rod rotatably journalled adjacent said equalizer bar, an arm secured to said rod and having a bifurcated extremity engaging said equalizer bar, a second arm secured to said rod, a brake pedal, a connection between said last mentioned arm and said pedal, a disconnected coupling between one of said brake actuating shaft arms and said brake pedal, and an independently manually operable member disconnectedly coupled with the other of said brake actuating shaft arms.

In testimony whereof, I, MONTGOMERY W. MCCONKEY, sign this specification.

MONTGOMERY W. McCONKEY.